J. RUSSELL.
Corn Husker.

Patented March 21, 1871.

Witnesses:
Charles L. Barritt
Franklin Barritt

Inventor:
Jacob Russell

J. RUSSELL.

Corn Husker.

No. 112,967.

Patented March 21, 1871.

Witnesses:
Charles L. Barritt
Franklin Barritt

Inventor.
Jacob Russell

United States Patent Office.

JACOB RUSSELL, OF BROOKLYN, NEW YORK.

Letters Patent No. 112,967, dated March 21, 1871.

IMPROVEMENT IN MACHINES FOR HUSKING CORN.

The Schedule referred to in these Letters Patent and making part of the same.

*To all whom it may concern:*

Be it known that I, JACOB RUSSELL, of Brooklyn, Kings county, and State of New York, have invented certain new and useful Improvements in Corn-Huskers; and I do hereby declare that the following is a full description of the same.

The nature of my invention consists—

First, in combining with a central guide-strip or bar one or more pairs of husker-rollers, so arranged as to make one of the rollers of each pair the bed of a husking-trough, between the sides of the guide-strip and the upper roller of each pair of huskers.

Second, in combining with a stripper-roller a wooden plain-surfaced roller, having at each end and on opposite sides of the roller V-shaped notches, cut therein for the purpose of facilitating the feeding of extra or unusual-sized stalks between the stripper and the opposing roller by passing them in by the V-shaped notches.

Third, in combining with a stationary apron or inclined table (for leading the ear of corn as discharged from the stalk to the husker-troughs) an adjustable slide upon its upper edge, so as to increase or decrease the space between it and edge of the stripper-roller shield, to prevent the ear of corn from being fed into the stripper-rollers.

Fourth, in combining with the back end of the husking-machine a gear-protector, for the purpose of keeping the husks and dirt from getting into the gear-wheels while the machine is in motion.

But to describe my invention more particularly, I will refer to the accompanying drawing forming a part of this specification, the same letters of reference, wherever they occur, referring to like parts.

Sheet 1—

Sheet 2—

Figure 1:
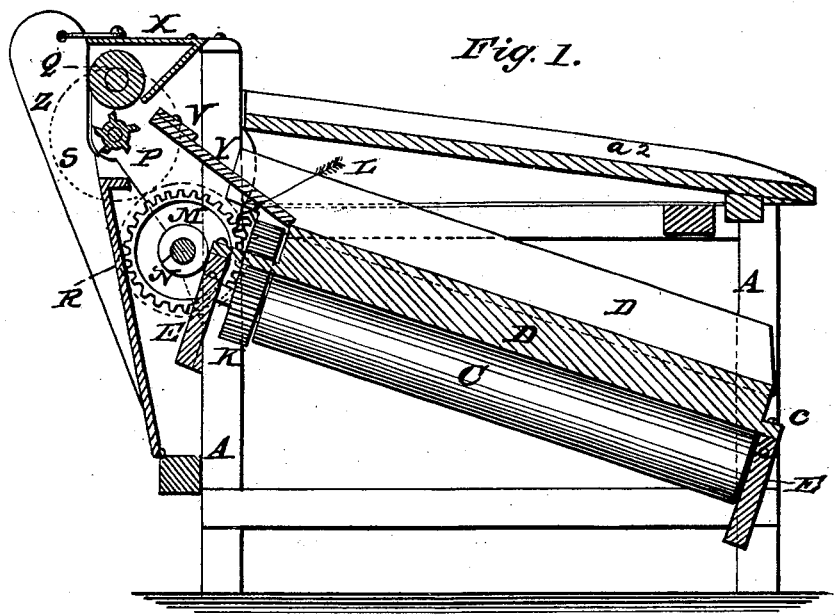
Figure 1 is a vertical section of the husker through the line *x x*, fig. 2.
Figure 2:
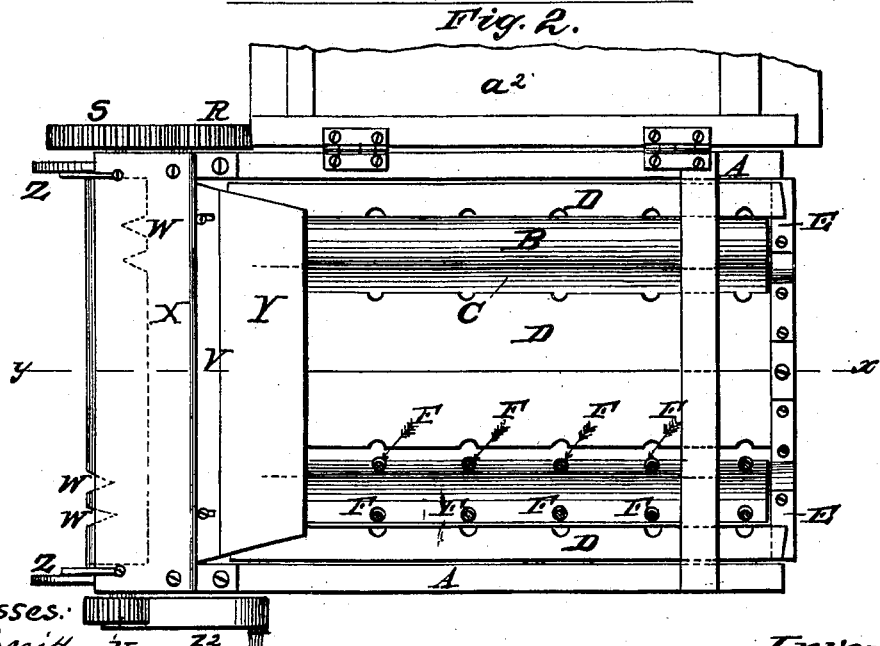
Figure 2 is a plan view of the husker.
Figure 3:
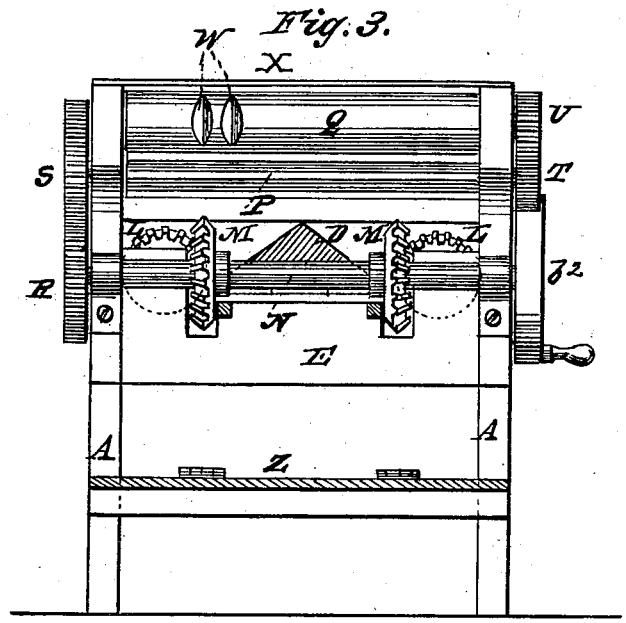

Figure 3 is a back-end view of the husker.

Figure 4:
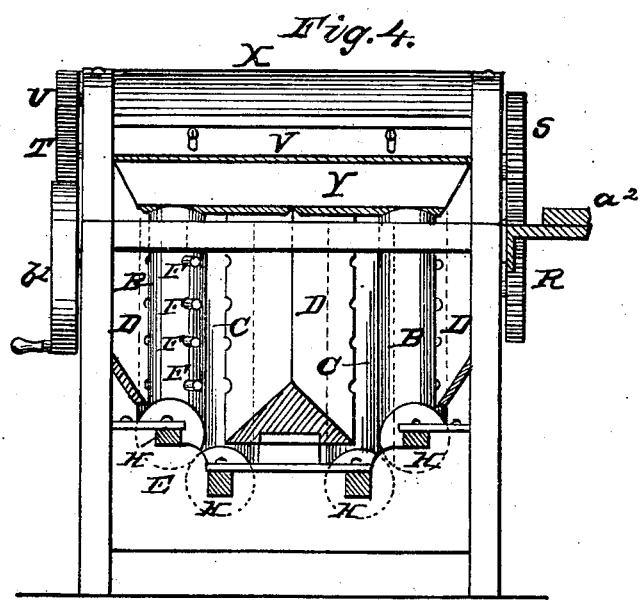

Figure 4 is a front-end view of the same.

Letter A represents the frame of the machine, which may be made of wood or other suitable material, as desired.

Longitudinally of it, and in a slanting position, is arranged two or more, or less number, of sets or pairs of husking-rollers, B and C, and guide-strips or bars D.

These rollers are secured or supported in suitable bearings E at the back and front ends of the frame A, and are arranged in such a position with reference to the guide-strip D as to make the husking-roller C the bed of the husking-trough. By this arrangement it will compel the ear of corn to slide down the trough upon the surface of the roller C, and in contact with the side roller B, and thus enable the pins F of the rollers B and C to seize the husk and carry it down between the impinging surfaces of the husker-rollers, to tear or strip it from the ear of corn.

The pins F in the husker-rollers are automatically and intermittently extensible.

The object of this extensible operation of the pins is, first, to seize hold of the husk to insure its being carried between the husker-rollers; second, when the husk has been taken hold of by the rollers to retract within the shell of the roller, so that their surfaces may rotate in close contact with each other to bite or take hold of the husk to strip it from the ear of corn; and third, to prevent the breaking off of the pins or their fouling with fragments of husks, as would be the case if they were studs or non-extensible pins secured solidly into or upon the surface of the rollers.

To cause the pins F to operate automatically they are secured to a rod, G, arranged within the shell or case of the husker-rollers, and parallel with and on opposite sides of the stationary axis H, upon which the husker rotates.

On one side of this axis are formed two or more or less number of cams I.

This axis does not rotate, therefore, when secured in its bearings E. The cams on it are in such a position as to project the pins outward beyond the face of the husker-roller as it rotates at its upper and converging sides toward the trough, and thus enable them to seize hold of the husk to carry it between the rollers.

To retract the pins, and pin-holder rod or rack, springs J are secured upon the pins, between the rack and under side of the husker-shell, so that instantly the rack passes the cams it will be retracted and sheath the pins to prevent interfering with the rotation of the huskers, and having their surfaces always in continuous and close contact with each other to take hold of the husk to strip it from the ear of corn.

For the purpose of rotating the husker-rollers, cog-wheels K are secured to the upper ends of the husker-rollers in such a way as to allow the axis H to be secured in its bearings solidly; and also, in combination with the cog-wheels K on the husker-rollers B, is a bevel-cog wheel, L, which gears with a bevel-cog wheel, M, on the main propelling-shaft N of the machine.

Letters P and Q are a pair of stripper-rollers, arranged transversely of the upper and back end of the machine, in suitable bearings, and rotated by means of the cog-wheel R on the end of the shaft N, transmitting motion to them through the cog-wheels S, T, and U, on their axles.

The lower stripper P is armed with chisel-edged cutters or knives, that is, with a blunt edge almost. The object of this is to pinch or crowd off, as it may be said, the ear of corn as it is being drawn in between the strippers.

The upper stripper Q is made of wood, (though metal may be substituted,) of a uniform surface, except at opposite sides. At each end are cut one or more V-shaped notches, slightly below the face of the roller and of but about one-third its circumference.

The object of this V-shaped notch W is to enable the operator, when he happens to have a stalk of unusual size, to enter it between the strippers without delay or extra labor, as would be the case if no such notches were made in the upper roller, as described.

Letter X is a hood for covering the upper stripper-roller, and having its front edge bent downward and inward in such a manner as to assist the feed-table or apron Y in guiding the stalk of corn in between the strippers. This feed-table or apron is arranged in front of the lower stripper, and with its upper edge about on a level with its upper side, while its lower end slants downward so as to cover the gear-wheels on the ends of the husker-rollers, and prevents the husks from getting into the cog-wheels, and at the same time guiding the ear of corn as it is stripped from the stalk to the husker-trough for the rollers to strip the husk from it.

For the purpose of regulating the space between the feed-table and the edge of the hood an adjustable slide, V, is secured by set-screws to the upper edge of the feed-table, so that, as circumstances may from time to time require, to accommodate heavy or light stalks of corn, the space may be increased or decreased with great facility by means of the set-screws that bind the two parts together.

Letter Z is an adjustable back to the machine or gear-wheel protector, which is secured to the frame of the machine by hinges, so that it can be let down at pleasure to inspect and oil the gear-wheels, but at all other times kept locked up to prevent the dust and pieces of husks constantly falling from the stripper-rollers from getting into the gear-wheels to stop them from running.

Letter $A^2$ is a feed-table, secured by hinges to the upper rail of the frame of the machine. Upon this table the bundle of stalks of corn is laid preparatory to their being fed into the strippers. Its being hinged to the frame is not material, as any detachable table may be used. As a table is, however, absolutely necessary, its being hinged to the frame is a great convenience, and I therefore prefer that mode of combining it with the frame.

Letter $b^2$ is a crank or pulley on the main driving-shaft N for propelling the machine.

Having now described my invention, I will proceed to set forth what I claim as new and desire to secure by Letters Patent.

I claim—

1. The combination and relative arrangement of the guide-strip D and husking-rollers B C, as shown, to form the sides and bottom of the husking-trough, as described.

2. The combination of the stripping-rollers P and Q, when the latter is provided with the transverse V-shaped notches W on its surface, substantially as described and for the purpose set forth.

3. The combination of the adjustable slide V with the apron Y and the hood X, made as described, and all arranged and operating for the purposes hereinbefore set forth.

4. The improved corn-husking machine herein described, consisting of the said several parts and mechanisms specified and shown, constructed, combined, and arranged to operate in the manner and for the purpose set forth.

JACOB RUSSELL.

Witnesses:
 CHARLES L. BARRITT,
 FRANKLIN BARRITT.